(12) United States Patent
Coenen et al.

(10) Patent No.: US 6,177,904 B1
(45) Date of Patent: Jan. 23, 2001

(54) VERSATILE RADAR DATA SAMPLING CIRCUIT

(75) Inventors: Lance G. Coenen; Jeffrey R. Struthers; Michael B. Schober, all of Tucson; Candi M. Goelz, Oro Valley, all of AZ (US)

(73) Assignee: Raytheon Company, Lexington, MA (US)

( * ) Notice: Under 35 U.S.C. 154(b), the term of this patent shall be extended for 0 days.

(21) Appl. No.: 09/275,634

(22) Filed: Mar. 24, 1999

(51) Int. Cl.[7] .................................................. G01S 7/292
(52) U.S. Cl. .............................. 342/62; 342/89; 342/97; 342/195
(58) Field of Search ................................. 342/73, 89, 90, 342/91, 92, 94, 95, 96, 97, 98, 99, 100, 101, 173, 174, 195, 198, 62

(56) References Cited

U.S. PATENT DOCUMENTS

| | | | |
|---|---|---|---|
| 4,559,537 | * 12/1985 | Pearson, Jr. et al. | 342/99 |
| 4,680,589 | * 7/1987 | Bryant et al. | 342/196 |
| 5,001,490 | * 3/1991 | Fichtner | 342/195 |
| 5,012,251 | * 4/1991 | Kennedy et al. | 342/176 |
| 5,061,930 | * 10/1991 | Nathanson et al. | 342/13 |
| 5,327,141 | * 7/1994 | Sheldon | 342/159 |
| 5,629,705 | * 5/1997 | Spettel et al. | 342/62 |
| 5,760,734 | * 6/1998 | Urkowitz | 342/159 |
| 5,917,442 | * 6/1999 | Manoogian | 342/62 |
| 5,995,049 | * 11/1999 | Komatsu et al. | 343/700 MS |

* cited by examiner

*Primary Examiner*—John B. Sotomayor
(74) *Attorney, Agent, or Firm*—David W. Collins; Andrew J. Rudd; Glenn H. Lenzen, Jr.

(57) ABSTRACT

An efficient receiver system (80) adapted for use with a pulsed radar system. The receiver system (80) includes a first circuit (82) for receiving a first signal and providing a second signal in response thereto. A second circuit (96) compares the second signal to a predetermined sequence (98) and provides a compare signal in response thereto. A third circuit (104) stores information pertaining to the second signal in response to the compare signal. A fourth circuit (92) generates receiver system instructions based on the stored information. In a specific embodiment, the second signal is a digital signal and the sequence is a digital sequence. The pulsed radar system includes a circuit for receiving and collecting data during a first dwell and for processing the data during a subsequent dwell. An inter-dwell time interval exists between the first dwell and the second dwell. The first, second, third, and/or fourth circuits (82, 96, 104, and/or 92) operate during the inter-dwell period. The information pertaining to the digital signal is information specifying whether an existing frequency channel on which the signal is received by the receiver system (80) is corrupted with electromagnetic interference. The receiver instructions include instructions to set the receiver system (80) to a new channel. In a more specific embodiment, the predetermined digital sequence (98) includes all zeros or all ones to check for the presence of radio frequency interference. The check for the presence of a data link message, the predetermined digital sequence (98) is a tag field or synchronization pattern of a data link message. The information pertaining to the digital signal represents a section of a data link message. The receiver instructions include instructions commanding the receiver system (80) to switch to data link reception mode.

26 Claims, 7 Drawing Sheets

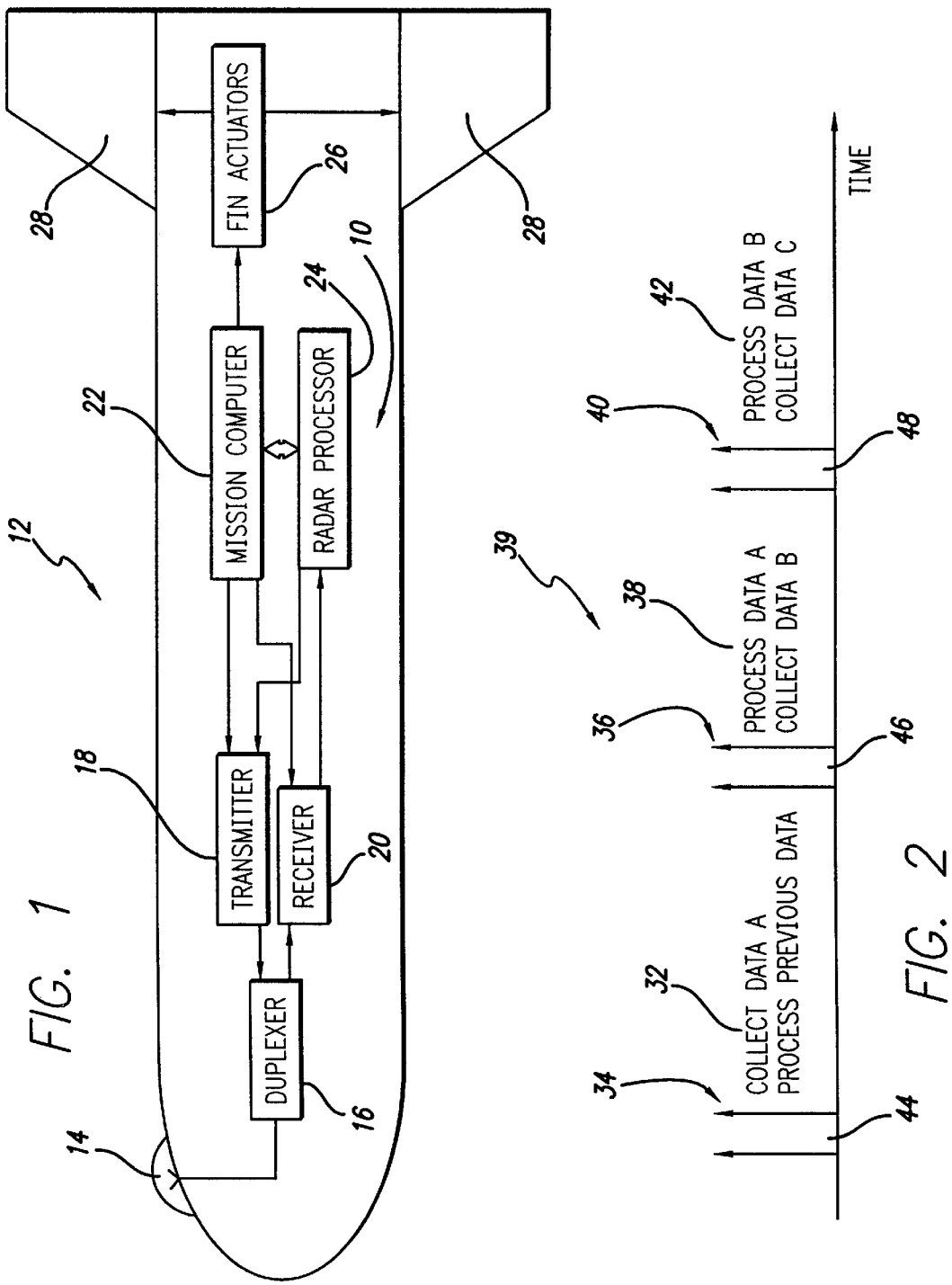

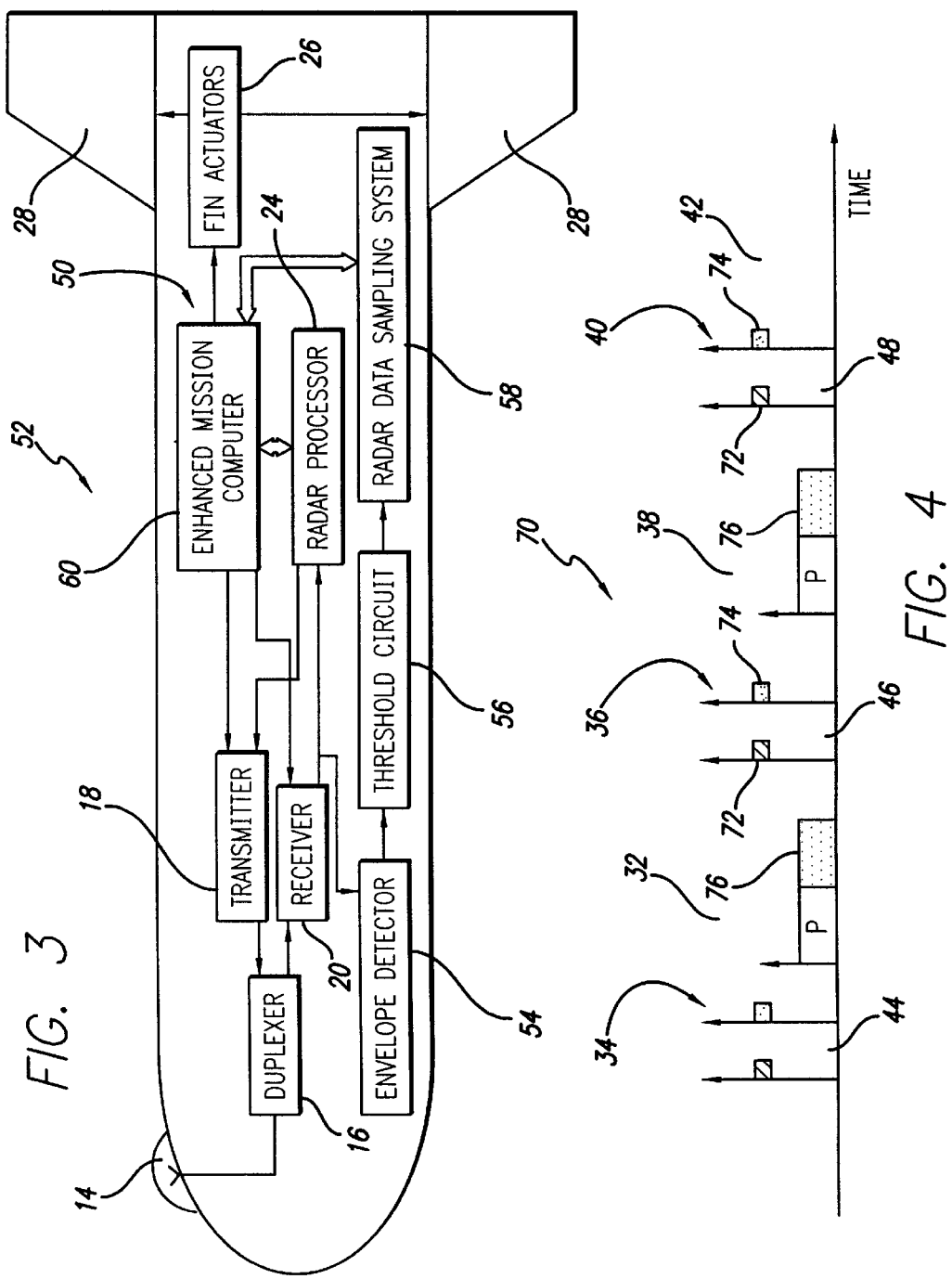

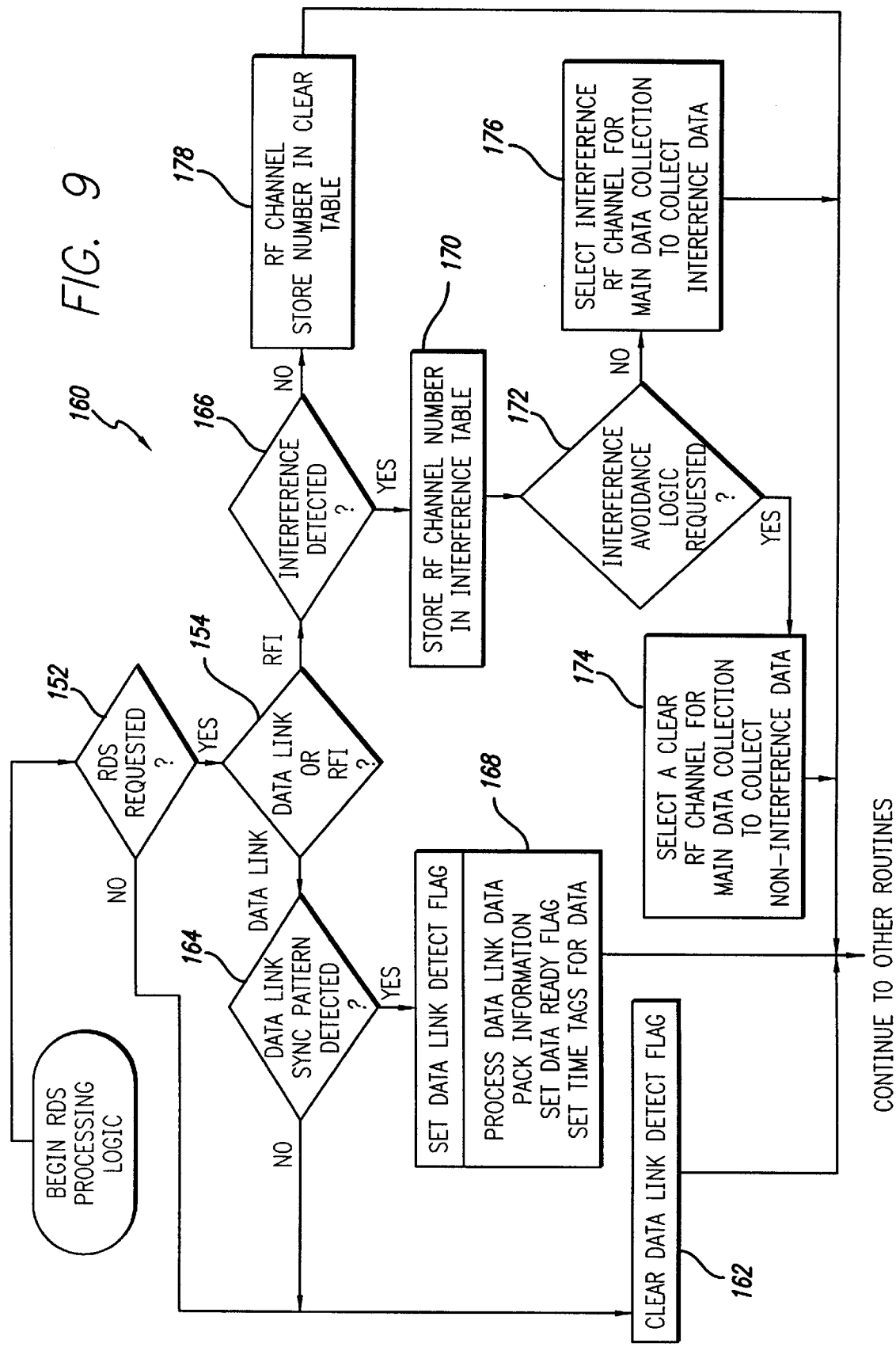

VERSATILE RADAR DATA SAMPLING CIRCUIT

BACKGROUND OF THE INVENTION

1. Field of Invention

This invention relates to systems for processing receiver data. Specifically, the present invention relates to radar data processing systems adapted for use with pulsed radar systems.

2. Description of the Related Art

Radar systems are used in a variety of demanding applications including air traffic control and missile guidance. Such applications often require radar systems to effectively track a target in electrically noisy environments and receive messages from an external transmitter.

Tracking ability and message reception are particularly important in missile guidance applications where pulsed radar systems are employed. A pulsed radar system typically includes a receiver, a transmitter, and a digital signal processor such as a missile mission computer. The transmitter transmits radar signals in the direction of a target. The radar signals reflect off the target and are received by the receiver. The receiver may also receive data link messages such as steering commands from an aircraft-based missile guidance system. The digital signal processor facilitates processing of the received signals and may also provide commands to facilitate missile target tracking.

Typically, received commands or radar signals are collected and processed during predetermined time intervals called dwells. The processing of signals received during a previous dwell occurs during a subsequent dwell. An inter-dwell period exists between dwells to allow for the reconfiguration of data processing circuits and other hardware in response to the processed data of the most recent dwell. Any processing of received signals or collecting of received signals is typically halted during this inter-dwell period.

The radar system transmits or receives signals within a predetermined frequency band, i.e., channel. Radio frequency interference may corrupt the channel making it unusable. The radar system determines if the channel is corrupted with radio frequency interference (RFI) after processing received signals. If the channel is corrupted with RFI, commands are often generated to assign the radar system to the next channel upon completion of the current dwell. However, if the next channel is also corrupted with RFI, the radar system cannot make the determination until the completion of the next dwell. If several corrupted channels are assigned to the radar system in sequence, valuable time is lost. During this time, the missile cannot detect targets or update track files.

External missile guidance systems often employ data link messages to transmit data such as steering commands to an airborne missile. To receive a data link message, the missile radar system employs either a dedicated receiver or must time-share the radar receiver for synchronous data link messages. Such time-sharing detracts from radar receiver resources. Dedicated receivers increase system cost and complexity and are usually avoided if the application can tolerate the associated performance penalty.

Hence, a need exits in the art for a radar system that can efficiently handle data link messages and account for RFI without requiring the use of additional dwells. There is a further need for a system that can support asynchronous messaging to improve system flexibility and performance.

SUMMARY OF THE INVENTION

The need in the art is addressed by the efficient receiver system of the present invention. In the illustrative embodiment, the inventive system is adapted for use with a pulsed radar system and includes a circuit for converting a received radar signal (first signal) to baseband. The resulting baseband signal (first signal) is envelope detected and compared to a voltage threshold via a first circuit, the output of which is designated as the second signal. A second circuit compares the second signal to a predetermined sequence and provides a compare signal in response thereto. A third circuit stores information pertaining to the second signal in response to the compare signal. A fourth circuit generates receiver system instructions based on the stored information.

In a specific embodiment, the second signal is a digital signal and the sequence is a digital sequence. The pulsed radar system includes a circuit for receiving and collecting data during a first dwell and for processing the data during a subsequent dwell. An inter-dwell time interval exists between the first dwell and the second dwell. The first, second, third, and/or fourth circuits operate during the inter-dwell period. In the specific embodiment, information pertaining to the digital signal includes information indicating if an existing frequency channel on which the signal is received by the receiver system is corrupted with electromagnetic interference. In the event that the channel is corrupted with electromagnetic interference, the receiver instructions include instructions to set the receiver system to a new channel via an 'avoid this channel' re-write message.

In a more specific embodiment, the predetermined digital sequence includes all zeros or all ones to determine if radio frequency interference is present on the current channel under analysis. When checking for a data link message, the predetermined digital sequence is a tag field or synchronization pattern of a data link message. The information pertaining to the digital signal represents a section of a data link message. The receiver instructions include instructions commanding the receiver system to switch to data link reception mode.

The first circuit includes a receiver for receiving the signal. The receiver has an envelope detection circuit and a threshold circuit for comparing an envelope of the signal to one or more programmable or adjustable thresholds and providing the second signal, i.e., the digital signal in response to the comparison. The receiver includes automatic gain control circuitry to control receiver gain, which affects the magnitude of the envelope in relation to the predetermined threshold.

In an illustrative embodiment, the present invention is a system for acquiring information pertaining to an operating signal environment of a radar tracking system. The system includes a receiver system for receiving a first signal within a frequency band and providing a second signal in response thereto when the first signal exceeds a predetermined threshold. A signal sampling system selectively samples the second signal and provides information about the operating signal environment in response thereto during an inter-dwell period of the radar tracking system. A computer controls the selective sampling of the signal sampling system, establishes the predetermined threshold, and establishes the frequency band all in response to the information about the operating signal environment.

In the specific embodiment, the second signal is a digital signal and the first signal is an analog signal. The radar tracking system is a pulsed radar system. The computer is a missile mission computer that includes software for activating the data sampling system between pre-existing radar dwells of the radar system where radar system hardware settings are typically adjusted.

The signal sampling system includes a shift register that samples the digital signals at a predetermined clock rate and stores a sequence of bits corresponding to the digital signal. The data sampling system includes a system clock and a frequency controllable clock divider connected to the computer for establishing the predetermined clock rate. The signal sampling system includes a compare logic block in communication with the shift register and includes a data patterns register in communication with the compare logic block. The compare logic block compares the sequence of bits to bits pre-loaded into the data patterns register. The data patterns register is pre-loaded with bits in accordance with signal sampling system functions.

In the illustrative embodiment, the computer runs software that implements the signal sampling system functions. The sampling system functions include analyzing the sequence of bits for evidence of radio frequency interference within the frequency band and analyzing the sequence of bits for evidence of a received data link message.

The novel design of the present invention is facilitated by the inclusion of the shift register for sampling the signal environment, the data patterns register, and the compare logic block for comparing the contents of the data patterns register to the contents of the shift register. These registers facilitate the checking of the current signal environment for the presence of radio frequency interference or the presence of a data link message during pre-existing radar inter-dwell periods. Frequency channels that have been analyzed for radio frequency interference by the present invention may then be stored in a list. This saves valuable time when a radar system must switch to a new channel due to interference on the current channel. In addition, data link messages that may otherwise go unrecognized or require additional dwells for synchronization are detectable by the present invention, which may allow receiver lock-on to a received data link message during an inter-dwell period. By utilizing radar inter-dwell periods, the present invention maximizes the use of available radar system time resources.

BRIEF DESCRIPTION OF THE DRAWINGS

FIG. 1 is a diagram showing a conventional radar system employed on a missile.

FIG. 2 is a timing diagram illustrating dwell periods for the radar processing system of FIG. 1.

FIG. 3 is a diagram showing a radar system constructed in accordance with the teachings of the present invention and employed on a missile.

FIG. 4 is a timing diagram illustrating dwell periods for the radar system of FIG. 3.

FIG. 9 is a flow diagram of processing software implemented in the mission computer of FIG. 5 for use with the radar data processing system of FIG. 5.

DESCRIPTION OF THE INVENTION

Figure 5:
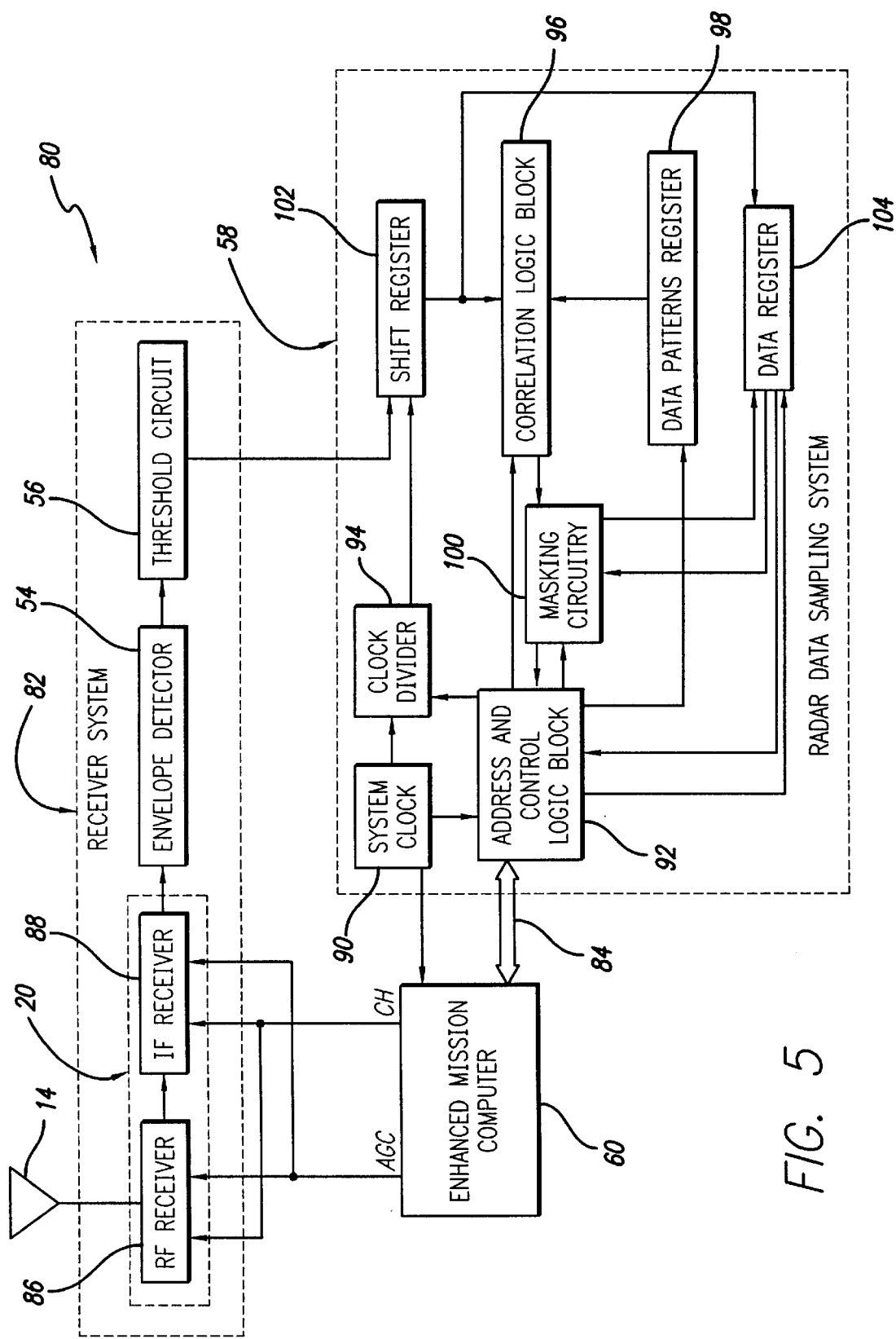
FIG. 5 is a diagram of a radar data receiving and processing system adapted for use with the dwell periods of FIG. 3 and constructed in accordance with the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility, such as two-way data link applications.

The following review of a conventional radar system is intended to facilitate an understanding of the present invention.

FIG. 1 is a diagram showing typical radar system 10 employed on a missile 12. The radar system 10 includes an antenna 14 that is connected to a duplexer 16. The duplexer 16 is connected to both a transmitter 18 and a receiver 20. The transmitter 18 is connected to a mission computer 22 and a radar processor 24. The receiver 20 is also connected to the mission computer 22 and the radar processor 24. The radar processor 24 and the mission computer 22 are interconnected. Fin actuators 26 are connected to the mission computer 22 and selectively actuate fins 28 in response to commands received from the mission computer 22.

In operation, the mission computer 22 runs software for controlling the overall operation of the radar system 10. The duplexer 16 enables sharing resources of the antenna 14 among transmission and receiving functions implemented by the transmitter 18 and the receiver 20, respectively. The radar processor 24 provides radar pulses to the transmitter 18, which are then transmitted via the antenna 14 by way of the duplexer 16. During a dwell interval, the radar processor 24 collects return radar signals reflected from a target (not shown) or from other objects via the receiver 20, the duplexer 16, and the antenna 14. The return signals are analyzed during another dwell period by the radar processor 24 to determine the range, velocity, or other or other properties of the target, such as target angle. Between dwell periods, radar hardware settings are reconfigured to account for the new targeting information. During these inter-dwell periods, data collection and processing is inhibited. The properties of the target, such as range and/or velocity, are fed to the mission computer 22. The mission computer 22 generates missile steering commands to the fin actuators 26 that then steer the missile system accordingly via the fins 28.

Data link messages such as commands may be sent to the mission computer 22 via an external transmitter (not shown) to affect steering functions or other missile system parameters. In this situation, asynchronous operation is not employed. The data link messages are received by the antenna 14 and transferred to the mission computer 22 via the receiver 20 and the radar processor 24. During a dwell period, the radar processor 24 or mission computer 22 may determine that an asynchronous data link message is being received. The mission computer 22 must then synchronize receive clocks (not shown) in the receiver 20 to the carrier frequency of the incoming data link message to enable the receiver 20 to lock-on the data link message. The process of synchronizing to data link message is often time consuming, requiring one or more dwell periods.

The receiver 20 may contain a radio frequency (RF) section, and intermediate frequency (IF) section, and an analog-to-digital converter to prepare received signals for digital processing by the mission computer 22 and/or other processors such as the radar processor 24.

The radar system 10 collects received signal data on a dwell-to-dwell basis. Data collection is inhibited between dwells when radar hardware modes are updated for the next dwell. The radar system 10 can only react to the changing signal environment at the completion of a data collection dwell.

FIG. 2 is a timing diagram illustrating dwell periods 39 for the radar processing system 10 of FIG. 1. A first dwell period 32 occurs after first set of two dwells 34. A second set of two dwells 36 follows the first dwell period 32. A second dwell period 38 follows the second set of two dwells 36. A third set of two dwells 40 follows the second dwell period 38. A third dwell interval 42 follows the third set of two dwells 40. A first inter-dwell period 44 occurs between the first set of two dwells 34; a second inter-dwell period 46 occurs between the second set of two dwells 36, and a third inter-dwell period 48 occurs between the third set of two dwells 40.

In the first dwell period 32 new data is collected, i.e., Data A, while previously collected data is processed. In the second dwell period 38, Data A that was collected in the first dwell period 32 is processed, and new data, i.e., Data B is collected. During the subsequent third dwell period 42, Data B is processed and new data, i.e., Data C is collected. Hence, during a dwell period, new data is collected while previously collected data is processed.

The results of the processing of previously collected data may suggest a change in radar system hardware modes. For example, if upon processing the previously collected data, the radar system determines that the data is corrupted by radio frequency interference (RFI), receiver channel settings may be set to a new channel. The resetting of hardware modes or settings occurs during the inter-dwell periods 44, 46, and 48.

Typically, during the inter-dwell periods 44, 46, and 48, no radar data or other signal data is collected by the radar system 10, as the inter-dwell periods 44, 46, and 48 are typically reserved for the reconfiguration of pre-existing hardware.

Dwells are typically implemented via circuitry and methods known in the art, which is application-specific. Time spacing between dwells is also application-specific.

Those skilled in the art will appreciate that the duplexer 16 may be omitted and separate antennas may be employed for the transmitter 18 and receiver 20 without departing from the scope of the present invention.

FIG. 3 is a diagram showing a radar system 50 constructed in accordance with the teachings of the present invention and employed on a missile 52. The radar system 50 is similar missile system 10 of FIG. 1 with the exception that the radar system 50 includes an envelope detector 54 connected at an output of the receiver 20, a threshold circuit 56 connected at an output of the envelope detector 54, a radar data sampling system (RDS) 58 connected an output of the threshold circuit 56 and connected to a software-enhanced mission computer 60.

A system (not shown) similar to the system 50 may be employed and configured to communicate with the system 50 forming a two-way data link. The transmitter of the separate radar system can transmit data recognizable by the radar data sampling circuit 58. The system 50 can tune to the frequency used by the other radar system (not shown) and wait for the receipt of a known pre-established pulse pattern. Upon receipt of the recognized pulse pattern, the system 50 can initiate two-way data link communications.

The envelope detector 54 computes the sum of the squares of a two-channel input from the receiver 20 to generate a signal magnitude envelope in accordance with practices well known in the art. Those skilled in the art will appreciate that other enveloped detection methods may be employed without departing from the scope of the present invention.

The magnitude envelope is compared to a predetermined threshold by the threshold circuit 56, the construction of which is well known in the art. The threshold circuit 56 outputs a high state such as one volt or a low state such as a zero volts if the predetermined threshold is exceeded or not exceeded by the signal magnitude envelope, respectively.

The level of the predetermined threshold relative the signal magnitude envelope is controllable by controlling automatic gain control (AGC) circuitry (not shown) via the mission computer 60. The construction of and control over AGC circuitry is well known in the art.

Those skilled in the art will appreciate that other methods may be employed for controlling the value of the predetermined threshold relative to the magnitude envelope such as via threshold setting circuitry that sets the predetermined threshold directly, without departing from the scope of the present invention.

Output from the threshold circuit 56 is a digital signal that contains information about the corresponding analog signal received by the receiver 20. The digital signal provides input to the radar data sampling (RDS) system 58.

The RDS 58 facilitates the analysis of the current operating signal environment of the radar system 50. The sampling system 58 samples the digital signal output from the threshold circuit 56 at a predetermined sampling rate that is controlled by software (as discussed more fully below) running on the software-enhanced mission computer 60. The sampled signal is stored in a register, as discussed more fully below, and may then be compared with other stored digital signals to determine if the sampled signal represents noise or a data link message.

The RDS 58 may trigger the receiver 20 and/or transmitter 18 to switch channels if the sampled signal represents noise indicative of a noise-corrupted channel, and may analyze subsequent channels for noise. The RDS 58 can detect noise on the current channel. A list of clear, i.e., relatively noise-free channels may be stored in a memory of the computer 60 for future use by the radar system 50. In addition, if the RDS 58 determines that the sampled signal represents a data link message, the sampling system 58 may collect the message during an inter-dwell period if the message is relatively short, may collect parts of the message at different inter-dwell periods, or may trigger the radar system 50 to enter a data link reception mode to collect the entire message. Some desirable activities of the radar system 50 after analysis of the signal environment by the RDS 58 are application-specific and may be programmed into the mission computer 60 by those ordinarily skilled in the art.

A novel aspect of the RDS 58 is the fact that the sampling system 58 may be activated between radar dwells, enabling data collection and processing where previously no data collection and/or processing was possible. Unique software running on the mission computer 60 facilitates activation and control over the sampling system 58 as is discussed more fully below.

FIG. 4 is a timing diagram illustrating dwell periods 70 for the radar system 50 of FIG. 3. With reference to FIGS. 3 and 4, during the first dwell period 32, control software (as discussed more fully below) is run by the software-enhanced mission computer 22 to set up controls for the radar data sampling (RDS) system 58. In the second inter-dwell period 46, an RDS data collection period 72 exists where the RDS 58 performs passive data collection and samples the digital data output from the threshold circuit 56. Directly following the second set of dwells 36, an RDS processing period 74 exists where the RDS 58, with the aid of the mission computer 60, processes data collected by the RDS 58.

The first dwell period 32 and the second dwell period 38 include a software control setup period 76 where software controls are setup (as discussed more fully below) for the radar sampling system 58.

The RDS 58 facilitates utilization of the inter-dwell periods 44, 46, and 48, for sampling and analyzing the existing signal environment. In pre-existing or conventional radar systems, the inter-dwell periods 44, 46, and 48 are normally reserved for hardware reconfiguration and no data collection or processing is permitted.

The present invention allows sampling, at a different RF, of the current signal environment between normal dwells of the main radar system 50. Current state-of-the-art radar operation inhibits data collection during the inter-dwell period. The present invention provides for the collecting of samples during this period at the same RF channel or different RF channel than is being used by the radar system 50 during each dwell. The RDS 58 samples the result of a compare operation between the envelope of a base-band video signal output from the threshold circuit 56 and an analog threshold maintained in the threshold circuit 56. The resultant 0 or 1 data is stored in a shift register (as is discussed more fully below) in the RDS 58. Since receiver gain is also under separate control for this sampling, the analog threshold of the threshold circuit 56 is implicitly controllable in the present exemplary embodiment.

Two new capabilities are enabled in radar systems that employ the Radar Data Sampling system (RDS) 58. The first capability enabled as a result of the RDS 58 is improved radar performance in the presence of radio frequency interference (RFI). The inherent flexibility of the RDS 58 allows software running on the enhanced mission computer 60 to tune the RDS 58 to a separate RF channel away from the one in use for each dwell. This gives the radar system 50 the opportunity to determine alternate clear channels prior to any interruption of the main dwell processing. Should the main dwell processing detect RFI, alternate clear channels are readily available.

A second important capability enabled by the RDS 58 is asynchronous data link reception. In this mode of operation, the RDS 58 is used to tune the receiver 20 to an RF channel that may contain a data link waveform. During each inter-dwell period the software running on the enhanced mission computer 60 examines the shift register contents or uses the pattern recognition circuitry (as is discussed more fully below) to determine the presence of a data link signal. Depending upon the message format used in a particular implementation, the software may have all required data link information stored in the shift register. In a more common scenario, radar system processing is interrupted and the receiver 20 is reconfigured to processes the full data link information. The RDS 58 allows for uninterrupted radar operation when no data link message is present. A message can come at any time since the RDS 58 is constantly sampling between radar main dwells, unlike in previous radar systems.

As shown in FIG. 4, the present invention may re-configure the hardware to tune to a different RF channel, sample the signal environment, and re-configure the hardware a second time prior to the next dwell period. Due to pattern recognition circuitry of the present invention, as is discussed more fully below, an immediate reaction to the sampled data may occur. Otherwise, the sampled data is available for inspection along with the data collected in the previous dwell. Use of the inter-dwell period makes it possible to process two different RF bands in a near simultaneous manner.

FIG. 5 is a diagram of a radar data receiving and processing system 80 adapted for use with the dwell periods 70 of FIG. 3 and constructed in accordance with the teachings of the present invention and showing more detail of the RDS 58 of FIG. 3. The radar data receiving and processing system 80 includes a receiver system 82 connected to the antenna 14. The receiver system 82 receives automatic gain control (AGC) and channel (Ch) inputs from the software-enhanced mission computer 60 and provides output to the RDS 58. The RDS 58 is connected to the mission computer 60 via a bus connector 84.

The receiver system 82 includes the receiver 20 having a radio frequency (RF) receiver 86 connected to the antenna 14 and includes an intermediate frequency (IF) receiver 88 that receives input from the RF receiver 86 and provides output to the envelope detector 54. The output of the envelope detector 54 is input to the threshold circuit 56. The threshold circuit 56 provides the output of the receiver system 82.

The IF receiver 88 and the RF receiver 86 both receive the channel input (Ch) and the AGC input from the mission computer 60. The AGC input sets the gain of the receivers 86 and 88, and the channel input is used to maintain or change the frequency band, i.e., channel on which the receivers 86 and 88 are operating.

The operation of the receiver system 82 is similar to the operation of the receiver 20, the envelope detector 54, and the threshold circuit 56 of FIG. 3. The receiver system 82 is easily constructed by those ordinarily skilled in the art.

The RDS 58 includes a system clock 90. The system clock 90 provides input to the mission computer 60. The RDS 58 further includes an address and control logic block 92 and a clock divider 94. Note that the system clock 90 may be included elsewhere in the radar system 80 such as in the mission computer 60 without departing from the scope of the present invention.

The address and control logic block 92 provides input to the clock divider 94, a correlation logic block 96, a data patterns register 98, and masking circuitry 100, and is in communication with the mission computer 60 via the bus connector 84. The clock divider 94 provides input to a shift register 102. The shift register 102 receives input from the threshold circuit 56 of the receiver system 82 and provides output to the correlation logic block 96 and to a data register 104. The data patterns register 98 also provides input to the correlation logic block 96. The correlation logic block 96 provides input to the masking circuitry 100. The data register 104 is in bi-directional communication with both the masking circuitry 100 and the address and control logic block 92.

In operation, radar data sampling system software running on the mission computer 60 activates or tunes the RDS 58 so that the system 58 can sample data during inter-dwell periods. The clock divide ratio of the clock divider 94 is set so that the shift register 102 is clocked at a predetermined rate so as to effect sampling of the output of the threshold circuit 56 at a sampling rate equivalent to the predetermined rate. The sampling rate of the shift register 102 is application-specific and may depend on a desired oversampling ratio for a particular application.

If the mission computer 60 sets the RDS 58 to a radio frequency interference (RFI) mode, a pattern such as all zeros or low states is loaded into the data patterns register 98. Signals output from the threshold circuit 56 are sampled by the shift register 102 and maintained therein for comparison to the pattern stored in the data patterns register 98, which, in the present example is all zeros.

The comparison is performed by the correlation logic block 96 that generates a strobe or interrupt output for each element of the correlation logic block 96 corresponding to an element (such as a DQ flip-flop) of the shift register 102 having contents similar to the contents of the data patterns register 98. If the correlation logic block 96 has eight elements the correlation logic block 96 will provide eight parallel outputs to the masking circuitry 100.

The masking circuitry 100 selects from the eight outputs one or more outputs. The one or more outputs are analyzed by the masking circuitry 100 to help determine if a count should be incremented and if the data register 104 should latch contents from the shift register 102. If the contents of the shift register 102 are latched, i.e., stored by the data register 104, the contents may then be then be queried by and loaded into the address and control logic block 92 for further analysis.

In the present specific embodiment, the count is incremented by the masking circuitry 100 when the selected one or more outputs are all high states such as ones and a counter included in the masking circuitry, as discussed more fully below, is enabled. Those skilled in the art will appreciate that another count incrementing rule may be implemented by the masking circuitry 100 without departing from the scope of the present invention. For example, the masking circuitry 100 may increment the count when the selected one or more outputs are all low states or a predetermined combination of high states and low states.

The address and control logic block 92 may selectively activate or deactivate elements, as discussed more fully below, of the correlation logic block 96. Those skilled in the art will appreciate that this feature may be useful for establishing an effective oversampling rate to avoid state transition edges in the shift register 102, which may result in corrupted data.

As an example, when in RFI mode, the data patterns register 98 is loaded with all zeros. During an inter-dwell period, the mission computer 60 may cause the receiver 20 cycle through various frequency bands, i.e., channels. The shift register 102 loads information from the threshold circuit 56 pertaining to the signal environment of each channel. If a channel is clear of RFI, the zeros in the data patterns register 98 will match the contents of the shift register 102 as determined by the correlation logic 96. In this case, the channel is assumed to be clear and may be stored in a list of clear channels on the mission computer 60. As a result, when the current channel used by the radar system (see 50 of FIG. 4) becomes corrupted, a list of clear channels is accessible via the mission computer 60. This can save valuable time in terms of additional dwell intervals that would otherwise be required in a radar system lacking the radar data receiving and processing system 80.

As another example, when in data link reception mode, the right most element of the data patterns register 98 is loaded with an expected synchronization pattern such as a data link communications tag word. When the signal pattern in the last most element of the shift register 102 matches the tag word as determined by the correlation logic block 96, the data register 104 is enabled for the reception of data from the shift register 102 via a control signal received from the address and control logic block 92. The data register 104 loads the contents of the shift register 102, which may then be read by the address and control logic block 92. As a result, the radar data receiving and processing system 80 may read a message sent during an inter-dwell period that is approximately the size of the shift register 102. If time permits, the shift register 102 may load an additional message, or an additional portion of the current message, and the message may be read by the address and control logic block 92 and the mission computer 60.

The radar data receiving and processing system 80 improves upon the current state-of-the-art by enabling inter-dwell sampling. At the beginning of each dwell interval, the radar data sampling system (RDS) 58 samples the signal environment by comparing the base-band video amplitude output from the envelope detector 54 to an analog threshold. Single bit samples indicating a threshold crossing are stored in the shift register 102. The system 80 allows for separate frequency and gain control during the RDS 58 operation. Thus system 80 allows for the total radar system (see 52 of FIG. 4) to process information of two RF channels in a simultaneous manner.

The present invention is easily adapted to an existing pulsed radar system having a matched IF receiver such as the IF receiver 88. This receivers 86 and 88 and the envelope detector 54 convert a pulsed returning signal to baseband video. Existing pulsed radar systems may already include a method to sample the total signal envelope corresponding to the baseband video as is done by the threshold circuit 56.

In the present illustrative embodiment, the present invention uses the envelope detection circuit 56 and stores the results of a threshold compare operation into the shift register 102. Other methods exist to record video outputs may be used without departing from the scope of the present invention.

The ability to sample the signal environment at a different RF band than the one used for the dwell affords radar systems employing the system 80 with atleast two significant advantages. One advantage is an enhanced ability to operate in a RF Interference (RFI) environment. Since the RDS 58 allows for simultaneous sampling of two separate RF bands, the software can "look ahead" to other RF channels prior to their use. As a result, clear channels can be identified and selected should RFI develop in the primary channel. This capability also allows for clearing a group of frequencies when multi-frequency hopping is required. A second advantage is that asynchronous data link reception is also possible with the dual RF operation. In this case the second RF becomes the data link frequency. The software running on the mission computer 60 tunes the existing receiver channel to receive either the data link message, or a preamble that tells the software to re-configure the hardware for reception of the incoming data link message. Almost any type of message keying is possible depending upon the type of sample and store operation used in the subject invention. In the present embodiment, on-off keying is used.

The radar data receiving and processing system 80 may be implemented in a traditional Medium Pulse Repetition Frequency Radar detection unit which includes frequency controls and references, a transmitter/receiver and RF to IF frequency band conversion, and an electrical interface residing in a Radio Frequency (RF) environment. The system 80 is controlled by the digital mission computer 60. The IF receiver 88 down-converts RF transmissions into a frequency range which can be sampled using digital electronics.

The RDS 58 interfaces to the receiver system 82 via a digital input serial stream. This serial data represents real time, coherent down converted RF energy that has crossed a predetermined threshold in the receiver system 82 electronics. When enough RF energy is present to cross the threshold, the digital output of the threshold circuit 56 transitions to a certain state. When the RF energy falls below the threshold, the detector output changes to the opposite state. By sampling this serial data, the RDS 58 provides the mission computer 60 with the ability to detect the presence of RF interference sources. The mission computer 60 uses this information to change operating parameters of the system 80 and/or the radar system 52 of FIG. 3 in response to these interference sources.

The functions of the address and control logic block 92 may be implemented in software running on the mission computer without departing from the scope of the present invention.

With access to the present teachings, those ordinarily skilled in the art may easily construct a finite state machine to perform the functions of the address and control logic block 92 and may easily construct software for the mission computer 60 to implement the methods of the present invention.

Figure 6:
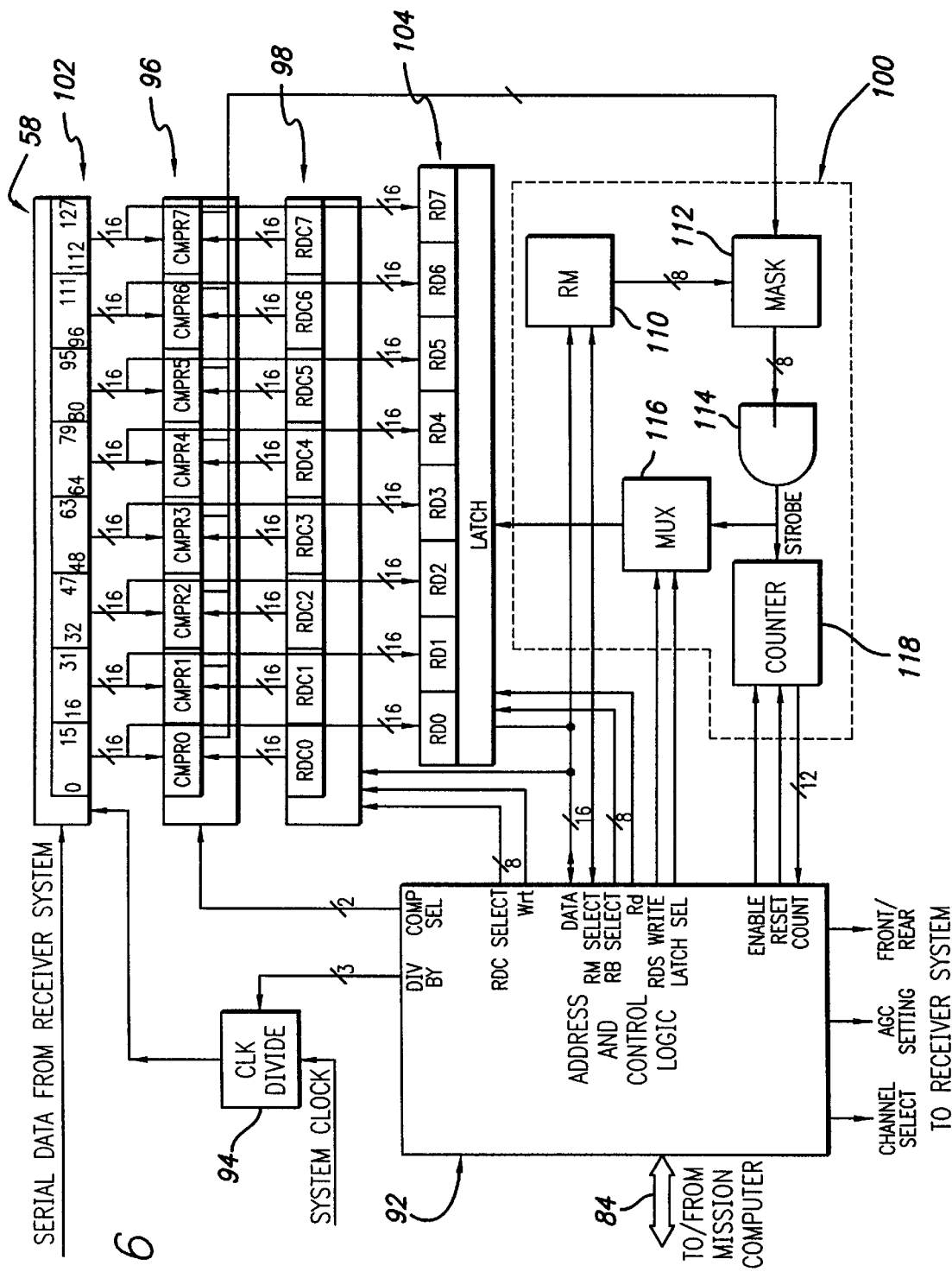
FIG. 6 is a more detailed diagram of the radar data sampling system of FIG. 5.

FIG. 6 is a more detailed diagram of the RDS 58 of FIG. 5. In the present specific embodiment, the shift register 102, the correlation logic block 96, the data correlation register 98, and the data register 104 each have eight sixteen bit wide sections. Those skilled in the art will appreciate that different sized sections other than sixteen bit sections and different sized registers other then eight sections wide may be used without departing from the scope of the present invention.

Sections of the compare logic block 96 are labeled CMPR0 though CMPR7. Either two bits, four bits, eight bits, or all sixteen bits of each section CMPR0 through CMPR7 are enabled by the address and control logic block 92 via a compare select (Comp Sel) connection to the correlation logic block 96. The ability to enable different bits of the compare logic block sections enhances the flexibility of the RDS 58 to handle varying applications. The address and control logic block 92 and the compare logic block 96 sections may be designed to accommodate different bit selections other than two, four, eight, or sixteen without departing from the scope of the present invention.

Different sections of the data patterns register 98 may be enabled via a radar data correlation connection (RDC select) between the address and control logic block 92 and the data patterns register 98 to improve flexibility of the RDS 58. The address and control logic block 92 may write predetermined patterns to the data patterns register 98 via a write connection (Wrt). The patterns may then be compared to the contents the serial shift register 102 via the compare logic block 96. If the data pattern in the data patterns register 98 sufficiently matches selected contents of the shift register 102 as determined via the address and control logic block 92 with the aid of the masking circuitry 100, the contents of the shift register 102 are loaded into the data register 104. The contents of the data register 104 are easily accessible by the address and control logic block 92 and the mission computer (see 60 of FIG. 5) via a data bus (Data) between the address and control logic block 92, the data register 104, the data patterns register 98, and the masking circuitry 100.

The masking circuitry 100 includes a mask register (RM) 110 connected to the data bus (Data) and connected to the address and control logic block 92 via a mask register select connection (RM Select). The mask register 110 provides output to a mask 112, the output of which is connected to an input of an AND gate 114. An output of the AND gate 114 is connected, in parallel, to an input of a multiplexer 116 and to an input of a counter 118. An output of the MUX 116 is connected to the data register 104 and is selectively controlled via a latch select input (Latch Sel) and a radar data sampling input (RDS Write) from the address and control logic block 92.

A count maintained by the counter 118 is read by the address and control logic block 92 via a count connection (Count). The counter 118 is selectively reset and/or enabled by an enable connection (Enable) and a reset connection (Reset), respectively, to the address and control logic block 92.

In operation, the masking circuitry 100 masks or selects from an eight bit output of the correlation logic block 96 certain bits in accordance with a pattern written to the mask register 110 via the address and control logic 92, if the mask register 110 is enabled via the RM select connection to the address and control logic block 92. The masked or selected bits are input to the AND gate 114. If all of the bits are high, such as all ones, a count in the counter 118 will be incremented if the counter 118 is enabled by the enable connection to the address and control logic block 92. The count may then be read by the address and control logic block 92 via the count connection.

In addition, the output of the AND gate 114 is provided as input to the MUX 116. If the latch select connection (Latch Sel) between the address and control logic block 92 and MUX 116 is activated, i.e., is in a high state, the input of the AND gate 114 will be selected as the output of the MUX 116 and will be transferred to the radar data register 104 as a latch enable signal (Latch) to enable the latching of, i.e., the storing of contents from the serial shift register 102.

If the latch select connection (Latch Sel) between the address and control logic block 92 and the MUX 116 is deactivated, i.e., in the low state, the RDS write signal from the address and control logic block 92 will be selected as the output of the MUX 116 and will be transmitted to the radar data register 104 as a latch enable signal (Latch) to enable the latching of, i.e., the storing of contents from the serial shift register 102. Data contained in certain elements of the data register 104 may be selected via a radar data select connection (RB Select) to the address and control logic block 92. The selected elements, from the RD0 through RD7 elements, may then be read by the address and control logic block 92 via the data connection (Data) and used in algorithms such as application-specific algorithms running on the address and control logic block 92 and/or running on the mission computer 60 of FIG. 5.

The address and control logic block 92 may provide adjustments to automatic gain control (AGC) settings, channel selection, and front/rear selection values upon analyzing signals sampled by the shift register 102. The AGC settings and the channel selection are input to the receiver system (see 82 of FIG. 5). The AGC settings connection provides control over receiver gain, and the channel selection provides control over the channel of the receiver. The AGC settings and the channel selection form feedback control loops between the RDS 58, the mission computer 60, and the receiver system 82 of FIG. 5.

The hardware blocks such as the shift register 102, the compare logic block 96, the data patterns register 98, the data register 104, and the masking circuitry 100 are all memory-map addressable, and are easily constructed by those ordinarily skilled in the art.

The data in the shift register 102 is correlated to data in the correlation registers 96 and the results are stored in the correlation counter 118 and the data latches, i.e., radar data register 104.

With reference to FIGS. 5 and 6, the shift register 102 accepts a serial data stream from the IF threshold detector unit 56 and inputs it to the serial shift register 102. The data is shifted into the register 102 at a clock rate which is selectable by the mission computer 60 and samples data for a predetermined time interval. The predetermined time interval is also adjustable by the mission computer 60 and is application-specific. Elements of the shift register 102 may be tapped for pulse width and pulse repetition frequency (PRF), or data correlation information.

The clock divider 94 for the shift register 102 is selectable from multiple clock rates referenced to the system clock 90. This allows the mission computer 60 to select the proper sampling frequency to meet the needs of data detection and correlation.

The radar data correlation logic block 96 contains compare sections designated RDC0 through RDC7. The sections are partitioned into bit widths matching the data bus size of the mission computer 60. These sections allow the mission computer 60 to program specific bit patterns for pulse width and PRF, or data recognition into the compare logic block 96. The sections are memory map addressable.

The masking circuitry 100 contains a mask register as is discussed more fully below. The mask register allows the correlation logic block 96 to mask out any combination of RDC register 98/serial shift register 102 element pairs. When masked, the data in the selected RDC register 98/serial shift register 102 element pairs is not used in the correlation process. This function allows the mission computer 60 to select particular RDC register 98/serial shift register 102 element pairs for correlation and to latch, in the data register 104, the remaining serial shift register elements for data link functions. Individual bits in the mask register correspond to an RDC section/Serial shift register section pair. The mask register is memory map addressable.

The data register 104 contains radar data register sections designated RD0 through RD7. The sections are partitioned into bit widths matching the data bus size of the mission computer 60. These sections latch the values of the serial data in the shift register 102. The sections are latched when selected data bit patterns in the RDC sections of the data patterns register 98 match the corresponding data in the serial shift register 102 or when the sample time window of the shift register 102 is complete.

The latch mode for the RDS 58 is controlled by software funning on the mission computer 60 and is written as a circuit control word to the registers 102, 96, 98, and 104 that are memory mapped addressable.

The radar data counter 118 contains counts the number of occurrences in which the data in the non-masked RDC register sections of the data patterns register 98 correlates to the serial data shifted into the serial shift register 102. The counter increments by one for each correlation in the compare logic block 96 as defined by the circuit mode control word, the mask register 110 and the selected data patterns in the data patterns register 98. The counter 118 is cleared by the mission computer 60 after reading and the counter data is memory map addressable by the mission computer 60.

The correlation logic block 96 compares data in the serial shift register 102 to data in data patterns register 98 using the compare blocks designated as CMPR0 through CMPR7. Each section of the compare logic block 96 (CMPRx) accepts a specified bit width pattern (dependent on the bus size of the mission computer 60) from the serial shift register 102 and the sections (CMPRx) of the compare logic block 96. Each of the compare logic block sections (CMPRx) are capable of performing comparisons of combinations of bit patterns from the shift register 102 and the data patterns register 98. Sample compare patterns are shown in Table 1.

TABLE 1

| Number of Bits | Bit compares |
| --- | --- |
| 2 bit compare | Compares value on bits 0,8 |
| 4 bit compare | Compares value on bits 0,2,4,8 |
| 8 bit compare | Compares value on bits 0,2,4,8,10,12,14 |
| 16 bit compare | Compares value on bits 0 through 15 |

When the state of the bits in the serial shift register 102 matches the state of the corresponding bits in the correlation logic block 96 (as selected by the number of bits and the mask register 110), the correlation logic block 96 generates a strobe which latches data in the shift register 102 into the data register 104 (if this mode is selected). The correlation counter 118 is also incremented by one count. This sequence continues until the sampling period has ended.

The address and control logic block 92 contains control logic, as is discussed more fully below, which allows the mission computer 60 to exercise complete and flexible control of the RDS 58. Control is accomplished via mission computer 60 that interfaces with memory map addressable control registers (not shown) in the address and control logic block 92. The mission computer 60 is able to select the following functions by writing the appropriate data patterns to the circuit control registers: a) Radar data latch source (latch on correlate or latch on end of sample); b) Selection of data bit compare (2, 4, 8 etc bit compare); c) Selection of serial shift register clock divide d) Enable/disable and reset of correlation counter; e) Selection of an RDC register via the Mask Register.

The address and control logic 92 may contain receiver control logic, easily constructed by those ordinarily skilled in the art, to allow the mission computer 60 to independently select a RF channel and AGC setting for the associated receiver system (see 82 of FIG. 5). This allows the RDS 58 to sample a RF channel different than the primary channel used for radar dwells. The separate AGC control also facilitates adjusting the effect of the analog threshold of the threshold circuit 56 of FIG. 5.

Figure 7:
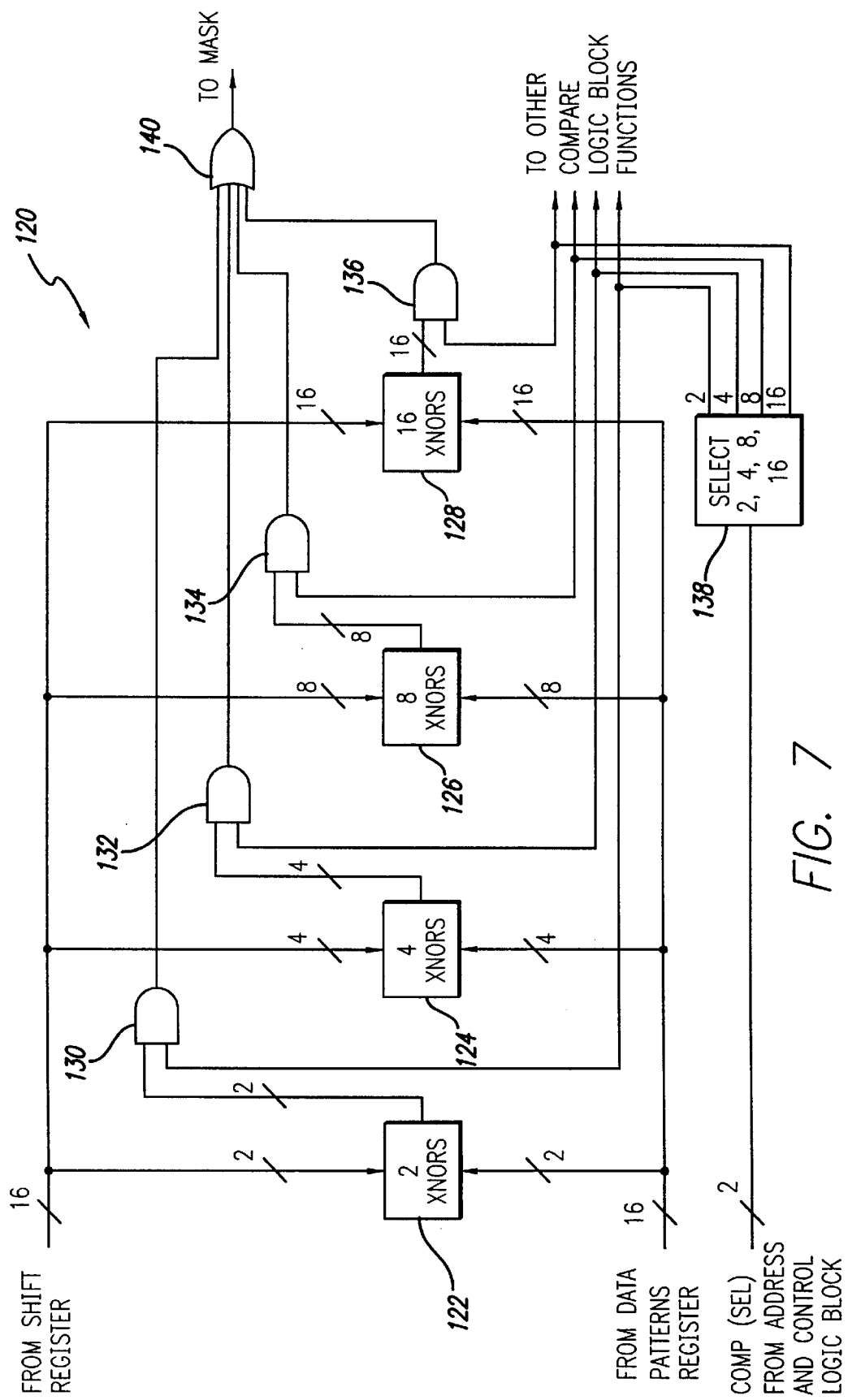
FIG. 7 is a diagram of a section of the compare logic block of the radar data processing system of FIG. 6.

FIG. 7 is a diagram of a section 120 of the compare logic block 96 such as CMPR7 of the radar data processing system 80 of FIG. 5. With reference to FIGS. 6 and 7, the section 120 receives a sixteen-bit input from the shift register 102 and a sixteen-bit input from the data patterns register 98. Two bits from each of the sixteen-bit inputs are compared via two XNOR circuits 122. Four bits from each of the sixteen-bit inputs are compared via four XNOR circuits 124. Eight bits from each of the sixteen-bit inputs are compared via eight XNOR circuits 126. Sixteen bits from each of the sixteen-bit inputs are compared via sixteen XNOR circuits 128.

Outputs from each of XNOR circuits 122, 124, 126, and 128 are input to a first AND gate 130, a second AND gate 132, a third AND gate 134, and a fourth AND gate 136, respectively. Each of the AND gates 130, 132, 134, and 136 are connected to a selector circuit 138 that receives the two-bit compare select (Comp Sel) from the address and control logic block 92.

The compare select activates, i.e., places a high state on the output of the selector circuit 138 selected by the compare select, i.e., either a two-bit output, a four-bit output, an eight-bit output, or a sixteen-bit output, which are connected to the first AND gate 130, the second AND gate 132, the third AND gate 134, and the fourth AND gate 136, respectively. In this way, the selector circuit 138 selects either a two bit comparison performed by the two XNOR circuits 122, a four bit comparison performed by the four XNOR circuits 124, an eight-bit comparison performed by the eight XNOR circuits 126 or a sixteen-bit comparison performed by the sixteen XNOR circuits 128.

If for example, a two-bit comparison is selected, a high state is placed on the corresponding two-bit input to the first AND gate 130, and zeros are placed at the corresponding inputs of the other AND gates 132, 134, and 136. All of the outputs of the AND gates 130, 132, 134, and 136 are input to an OR gate 140. If the two bits selected for comparison from the shift register 102 by the two XNOR circuit 122 match the two bits selected for comparison from the data patterns register 98 by the two XNOR circuits 122, the results of the comparison will pass though the AND gate 130 to an input of the OR gate 140. IF the two-bit comparison produces a match, a high state will be output from the first AND gate 130 and will cause a high state to appear at the output of the OR gate 140. This high state will correspond to one of the eight bits corresponding to each section of the compare logic block 96 that are output to the masking circuitry 100 for masking.

A different selector circuit 138 need not be provided for each separate element of the compare logic block 96. The outputs of the selector circuit 138 may be used for all of the elements of the compare logic block 96.

Figure 8:
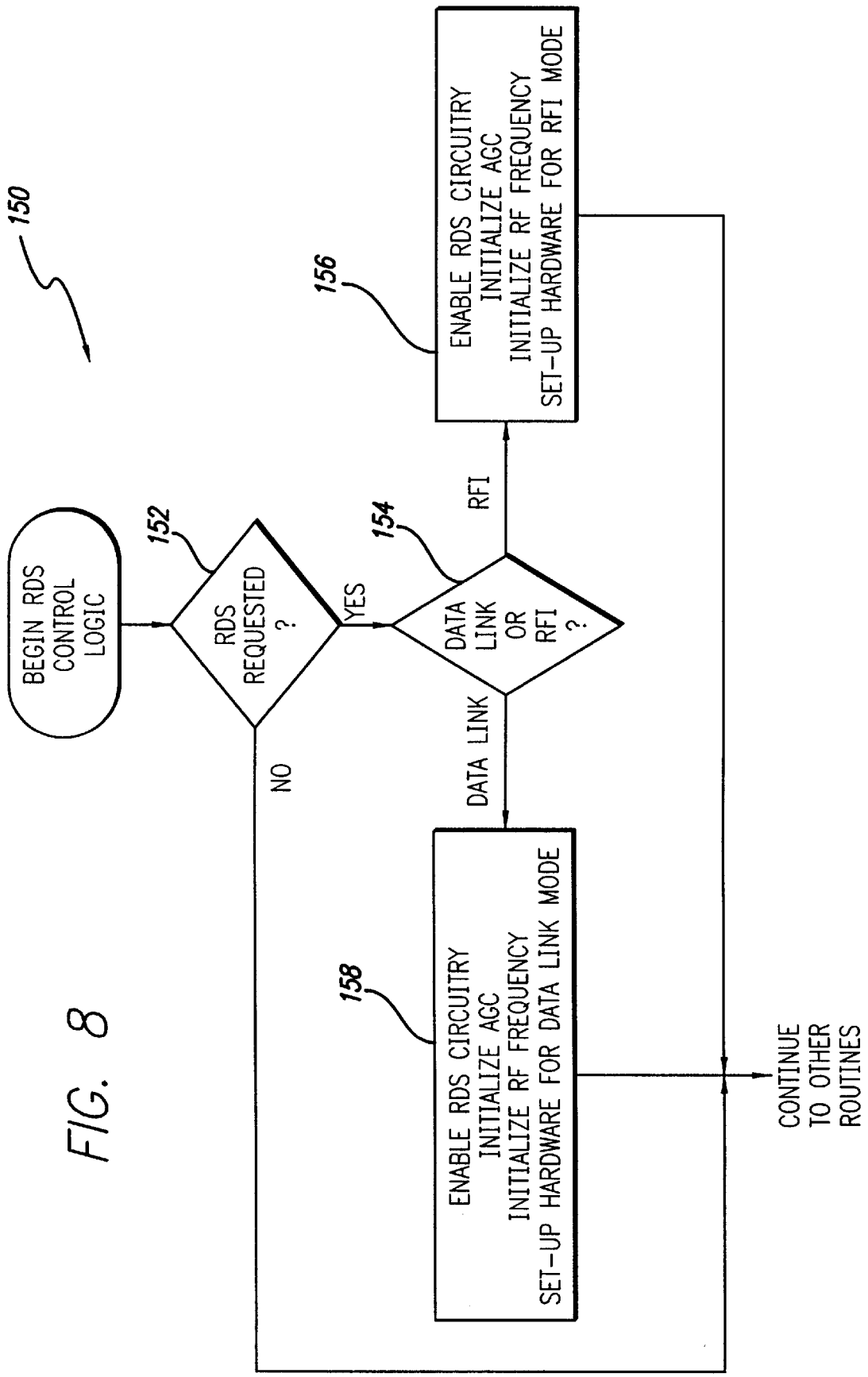
FIG. 8 is a flow diagram of control software implemented in the mission computer of FIG. 5 for use with the radar data processing system of FIG. 5.

FIG. 8 is a flow diagram of control software 150 implemented in the mission computer 60 of FIG. 5 and for use with the radar data processing system 80 of FIG. 5. With reference to FIGS. 3, 4, 5, and 8, during the software control setup periods 76 of FIG. 4, the software 150 is activated. In a request-checking step 152, the software 150 analyzes inputs received by the mission computer 60 from hardware such as the radar processor 24 or from other software functions to determine if information is requested from the radar data sampling (RDS) system 58 about an operating signal environment. In a query determination step 154, if RDS information is requested, the software 150 determines if the request pertains to a request for data link information or RFI information.

If no RDS data is requested as determined in the request-checking step 152, the control software is complete and control is passed to other routines as is discussed more fully below, including routines that may be application-specific.

If RFI information is requested, the software 150 enters an RFI step 156. In the RFI step 156, the software 150 enables RDS circuitry such as the registers and blocks 102, 96, 98, 104, and 100 in accordance with the information requested; initializes AGC circuitry in the receiver system 80 of FIG. 5, initializes the RF channel of the receiver system 80, and makes any additional adjustments to hardware to enter the system 80 into an RFI mode and the control software 150 is complete.

If data link information is requested in the query determination step 154, control is passed to a data link setup step 158 where the RDS circuitry is enabled, the AGC circuitry and the frequency channel are initialized, and any additional adjustments to hardware to enter the system 80 into a data link mode are performed. The control software 150 is subsequently complete and control is passed to other software or hardware routines as is discussed more fully below.

FIG. 9 is a flow diagram of processing software 160 implemented in the mission computer 60 of FIG. 5 and for use with the radar data processing system 80 of FIG. 5. The processing software 160 includes the request-checking step 152 and the query-determination step 154 as disclosed in FIG. 8. However, in the request-checking step 152, if it is determined that no RDS information is requested, a data link detection flag is cleared in a clearing step 162 before the processing logic 160 is ended and control is passed to other software or hardware routines. If RDS information is requested, control is passed to the query-determination step 154 where control is passed to a data link checking step 164 if data link information is requested, or control is passed to an interference-checking step 166 if RFI information is requested.

In the data link checking step 164, the processing logic 160 checks if a data link synchronization pattern, such as a data link tag word, has been detected by the RDS 58 of FIGS. 3, 5, or 6. If a data link tag word has been detected, control is passed to a data link flagging step 168 where a data link detection flag is set; information in the data link is processed and packed; a data ready flag is set; and time tags are set in preparation for receiving data. Subsequently the processing logic 160 ends and control is passed to other routines. If no data link synchronization pattern is detected, control is passed to the clearing step 162 where the data link detection flag is cleared.

If RFI information is requested as determined in the query-determination step 154, control is passed to the interference-checking step 166, where the current signal environment is analyzed for RFI. IF RFI is detected, control is passed to a channel-storing step 170 where information about the current channel corrupted by RFI is stored in an interference table. In a subsequent RFI avoidance-checking step 172, the processing logic 160 determines if interference avoidance logic is requested by other routines or hardware. If interference avoidance logic is requested, control is passed to a channel selection step 174 where a clear RF channel is selected for main data collection to collect data other than RFI data. Subsequently, the processing logic 160 ends. If in the RFI avoidance-checking step 172, it is determined that no interference avoidance logic is requested, control is passed to an RFI channel-checking step 176 where a subsequent channel is selected for RFI analysis by the data sampling system 58. Subsequently, the processing logic 160 ends and control is passed to other routines.

If in the interference-checking step 166 it is determined that no interference is detected on the current channel under analysis, control is passed to a channel-storing step 178 where the number of the current RF channel is stored in a table of clear channels. Subsequently, the processing logic 160 ends and control is passed to other routines.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An efficient radar receiver system having a first dwell a second dwell and an inter-dwell period therebetween, comprising:

first means for receiving a first signal and providing a second signal in response thereto;

second means for comparing said second signal to a predetermined sequence and providing a compare signal in response thereto, said second signal being a digital signal and said sequence being a digital sequence;

third means for generating receiver system instructions based on said compare signal; and means for receiving and collecting data during a first dwell period and for processing said data during a subsequent dwell period.

2. The invention of claim 1 further including fourth means for storing information pertaining to said second signal in response to said compare signal, said third means including means for generating receiver system instructions based on said stored information.

3. The invention of claim 1 wherein said first, second, and/or third means operate during said inter-dwell period.

4. The invention of claim 3 wherein said information pertaining to said digital signal is information specifying whether an existing frequency channel on which said signal is received by said receiver system is corrupted with electromagnetic interference.

5. The invention of claim 4 wherein said receiver instructions include instructions to set said receiver system to a new channel.

6. The invention of claim 4 wherein said predetermined digital sequence includes all zeros or all ones.

7. The invention of claim 4 wherein said predetermined digital sequence is a tag field or synchronization pattern of a data link message.

8. The invention of claim 7 wherein said information pertaining to said digital signal represents a section of a data link message.

9. The invention of claim 7 wherein said receiver instructions include instructions commanding said receiver system to switch to data link reception mode.

10. The invention of claim 2 wherein said first means includes a receiver for receiving said signal, said receiver including an envelope detection circuit and a threshold circuit for comparing an envelope of said signal to one or more thresholds and providing said digital signal in response to said comparison.

11. The invention of claim 2 wherein said receiver includes automatic gain control circuitry.

12. A system for receiving and analyzing an electromagnetic signal comprising:

first means for receiving said electromagnetic signal and providing a first digital signal in response thereto;

second means for storing said first digital signal;

third means for storing a compare signal;

fourth means for comparing said first digital signal to said compare signal and providing a second digital signal in response thereto; and fifth means for controlling said first means, said third means, and said fourth means in response to said second digital signal during an inter-dwell period of said system.

13. A system for acquiring information pertaining to an operating signal environment of a tracking system comprising:

a receiver system for receiving a first signal within a frequency band and providing a second signal in response thereto when said first signal exceeds a predetermined threshold;

a signal sampling system for selectively sampling said second signal and providing information about said operating signal environment in response thereto during an inter-dwell period of said tracking system; and a computer for controlling said selective sampling of said signal sampling system, for establishing said predetermined threshold, and for establishing said frequency band all in response to said information.

14. The invention of claim 13 wherein said second signal is a digital signal and said first signal is an analog signal.

15. The invention of claim 14 wherein said tracking system is a pulsed radar system.

16. The invention of claim 15 wherein said computer includes software for activating said data sampling system between preexisting radar dwells of said radar system when said radar system typically adjusts hardware settings.

17. The invention of claim 14 wherein said computer is a missile system mission computer.

18. The invention of claim 14 wherein said signal sampling system includes a shift register for loading said digital signals in accordance with a predetermined clock rate and thereby storing a sequence of bits corresponding to said digital signals.

19. The invention of claim 18 wherein said data sampling system includes a system clock and a frequency controllable clock divider connected to said computer for establishing said predetermined clock rate.

20. The invention of claim 18 wherein said signal sampling system includes a compare logic block in communication with said shift register and a data patterns register in communication with said compare logic block, said compare logic block for comparing said sequence of bits to bits pre-loaded into said data patterns register.

21. The invention of claim 20 wherein said data patterns register is pre-loaded with bits in accordance with signal sampling system functions.

22. The invention of claim 21 wherein said computer runs software for implementing signal sampling system functions that include analyzing said sequence of bits for evidence of radio frequency interference within said frequency band and analyzing said sequence of bits for evidence of a received data link message.

23. The invention of claim 22 wherein said software implements a method that includes the steps of:

checking if signal sampling information is requested by said tracking system;

determining if said digital signals represent radio frequency interference or a data link message if said signal sampling information is requested in said step of checking;

enabling said signal sampling system, initializing said threshold and said frequency band, and setting said signal sampling system for a data link mode, if said digital signals represent a data link message; and activating said signal sampling system, initializing said threshold and said frequency band, and setting said signal sampling system for a radio frequency interference mode, if said digital signals represent radio frequency interference.

24. The invention of claim 23 wherein said software implements a method that includes the steps of:

checking if radio frequency interference information or data link information is requested by radar system hardware;

analyzing a current signal environment for data link information and processing any available data link information if data link information is requested as determined in said step of checking; and examining said current signal environment for radio frequency interference and storing information pertaining to clear channels or corrupted channels if radio frequency interference information is requested as determined in said step of checking.

25. The system of claim 13 further including a second system equivalent to said first system for establishing a two-way data link.

26. A method for receiving and analyzing an electromagnetic signal comprising the steps of:

receiving said electromagnetic signal and providing a first digital signal in response thereto;

storing said first digital signal;

providing a compare signal;

comparing said first digital signal to said compare signal and providing a second digital signal in response thereto; and controlling said step of receiving, said step of providing, and step of comparing in response to said second digital signal during an inter-dwell period.

* * * * *